Dec. 11, 1928.
1,694,815
R. GARLICK
CHRISTMAS TREE STAND
Original Filed June 20, 1922
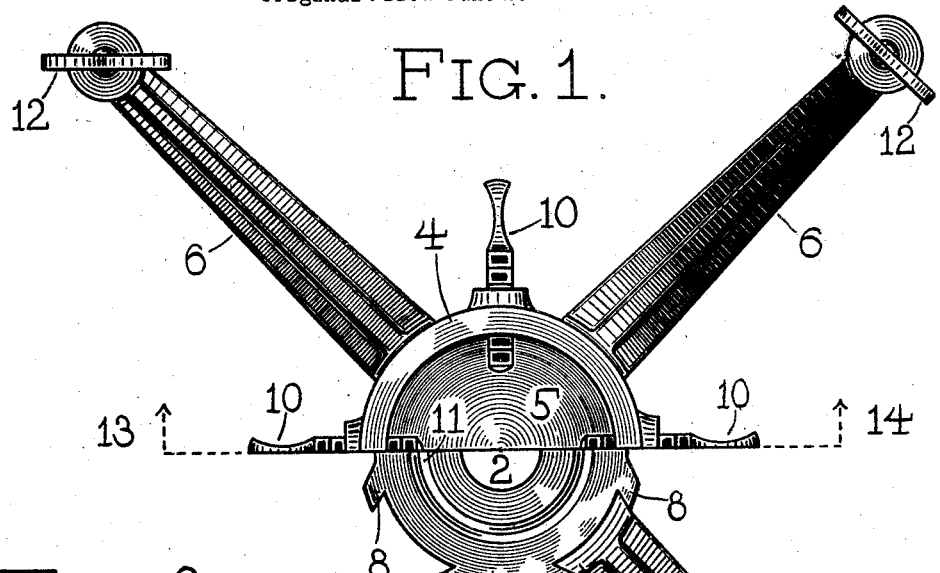
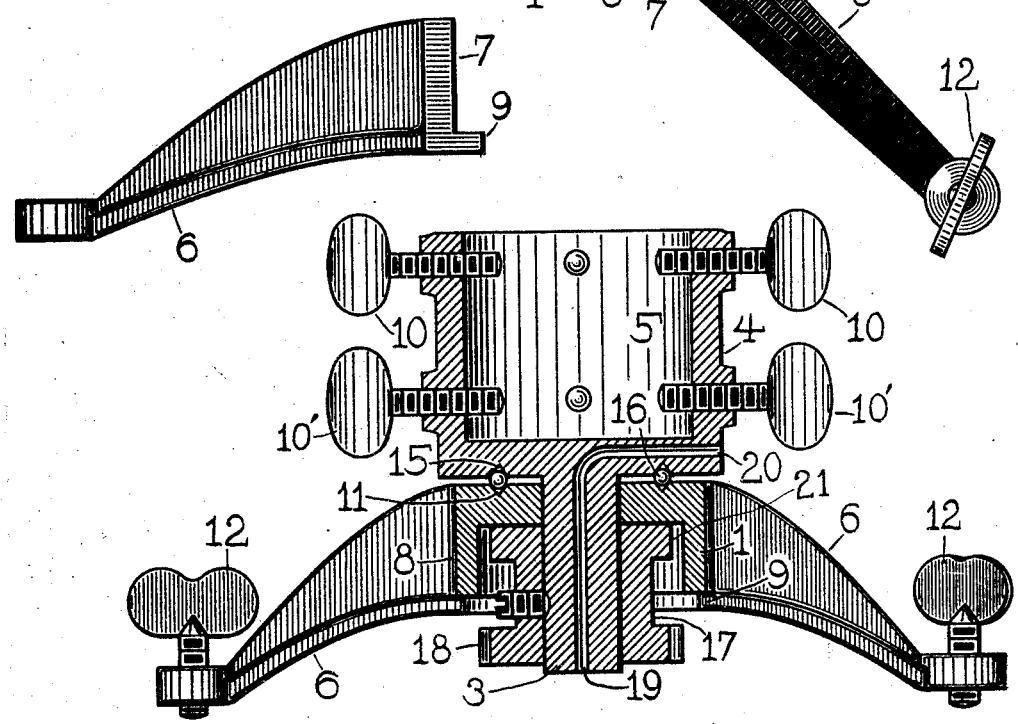
Ralph Garlick INVENTOR
BY HIS ATTORNEY Frank Carlson Patented Dec. 11, 1928.

1,694,815

UNITED STATES PATENT OFFICE.

RALPH GARLICK, OF TOTOWA, NEW JERSEY.

CHRISTMAS-TREE STAND.

Substitute for application Serial No. 569,750, filed June 20, 1922. This application filed October 29, 1924. Serial No. 746,712.

This invention relates to Christmas tree stands, and more particularly to the class wherein a rotatable tree socket is pivoted in a base member having removable legs, the present application being substituted for my former application bearing the Serial Number 569,750.

The main object of my invention is to provide a strong and convenient stand in which the butt of a tree may be rigidly secured and thereafter easily revolved without moving the legs supporting the whole.

Other objects are to provide means for irrigating a tree butt supported by the stand, to provide means for leveling the stand on an uneven floor, also to provide a special channel for electric light wires, and further, to make the stand in a collapsible form for compact and easy packing for shipment.

Further objects and attained advantages will appear hereinafter as this specification proceeds.

In the accompanying drawing, Fig. 1 is a plan view of a tree stand made according to the present invention, one leg and part of the socket 4 being omitted to disclose the construction.

Fig. 2 is a section view of Fig. 1 on line 13—14.

Fig. 3 is a side view of one of the legs of the preceding views, the leveling screw being omitted.

Throughout the views, the same reference numerals indicate the same or duplicate parts.

When Christmas trees are used, it is desirable not only to light them by electricity, but to rotate them for the resulting luminous and optical effects.

In order to do this, bearing in mind the previously mentioned objects, it is proposed to make a tree stand of the present design.

A base 1, having an aperture 2 in its upper portion is adapted to receive a shaft 3 of a socket 4 in whose chamber 5 any tree butt may be secured by the radially disposed thumb screws 10, 10, 10′, 10′. The base is provided with a plurality of vertical dovetailed pairs of projections or gibs 8, 8, 8 about its periphery between which gibs the inner beveled extremities 7—7 of the legs 6, 6, 6 may be snugly fitted.

Each leg has a horizontal extension or lug 9 which determines the position of the leg in relation to the base and supports the latter. It will be noted that not only is the socket 4 rotatably mounted in the base, but by virtue of the balls 16 in the ball races 11 and 15 in the opposed faces of the base and socket, respectively the rotation is greatly facilitated and rendered noiseless.

However, a retaining collar or bobbin 17 is secured to the socket shaft 3 in order to retain the socket in position and prevent loss of the ball bearings.

A gear 18 is formed upon the lower edge of the collar 17 in case it is desired to place a motor or other power unit in proximity to the gear in order to continuously rotate the socket. The various means thus used in other apparatus are so common as to be superfluous to illustrate, especially in view of the fact that my invention is complete and operative without said means.

On the other hand, as it is necessary to pass light wires to a tree supported by the stand without interfering with rotation of the tree, a wire channel 19 is formed in the shaft 3 and is turned horizontally above ball 16, extending radially outward at 20. If wires are passed through this channel, their source would be outside of 19, while they would pass directly up to a supported tree from aperture 20, this arrangement permitting a rather limited rotation of the tree. In this case, the gear 18 would be superfluous and could be eliminated.

The vertical sleeve 17 has a flange 21 at its upper extremity adapted to make light contact with the inner surface of cup 1 in order to correspond in adjacent position with the ball bearings, thus rendering the structure more steady in movement. On the other hand, this cup or casing serves as a protecting and concealing apron for the flange and most of the sleeve, the fact that the lugs 8—8 are mere projections on the continuous arcuate wall on the casing being an additional advantage as regards strength and uniformity of structure.

If continuous rotation were desired, a commutator of any known suitable construction could be secured to shaft 3, but as electric equipment forms no part of this application, it does not appear.

However, it is easily seen that if my stand were placed on the most uneven floor, the leveling screws 12, 12, 12 need only to be separately adjusted a little, and the stand will be solidly supported. When it is desirable to pack the stand for shipment, it is but necessary to pull off all the legs from the base and place them parallel with the axis of the stand, and a compact package will result.

Having thus fully described my invention, I claim:—

In a tree stand having a butt socket and legs to support the stand, a unitary intermediate casting including a hollow casing having integral vertically arranged parallel peripheral projections thereon for said legs, the top of said hollow casing having a reduced opening communicating with an open bottom in the casing, and a retaining member associated with said butt socket and protected by projecting into said casing from the open bottom thereof.

Signed at Little Falls, Passaic County and State of New Jersey, on this 30th day of September, 1924.

RALPH GARLICK.